Dec. 26, 1967      D. D. HEDBERG      3,359,657
GEOMETRIC STRUCTURE AND METHOD OF FORMING THE SAME
Filed Jan. 15, 1966

INVENTOR:
DONALD D. HEDBERG
BY
Dawson, Tilton, Fallon, Lungmus & Alexander
ATT'YS

United States Patent Office 3,359,657
Patented Dec. 26, 1967

3,359,657
GEOMETRIC STRUCTURE AND METHOD OF
FORMING THE SAME
Donald D. Hedberg, 802 Reba Place,
Evanston, Ill. 60202
Filed Jan. 15, 1966, Ser. No. 520,779
11 Claims. (Cl. 35—72)

This invention relates to three-dimensional geometric structures or models particularly suitable as visual aids in the teaching of subjects such as solid geometry and chemistry.

Although it is apparent that physical representations of various solid geometric shapes may be of considerable value in group or individual study of subjects such as solid geometry and physical chemistry, the use of such representations or models has been restricted because of their limited availability and their relatively high cost. For example, sets of pre-formed plastic geometric structures have been marketed to a limited extent in the past, but at a cost which is prohibitively or at least unreasonably high for most high school and college students. Consequently, a single set of such models may have to be used by all the students in a classroom, with the loss of individual benefits that might otherwise be gained if each student were free to examine and compare the models without the time restrictions made necessary by group study.

The expense of conventional pre-formed models becomes even more of a problem in the teaching of chemistry where it may be desirable to assemble a multiplicity of such models to represent the structural arrangements of molecules. Much of the instructional value of such models as teaching devices for beginning chemistry students, or as analytical devices for more advanced students, lies in permitting visual comparison between a variety of molecular structures, yet the limitations imposed by cost prevent to a large extent those comparisons and uses for which such models are otherwise ideally suited.

Accordingly, it is an object of the present invention to provide a demonstrative, educational device which is relatively inexpensive and which thereby overcomes the aforementioned disadvantages of pre-formed geometric models. Another object is to provide an inexpensive pre-cut planar structure of plastic material which may be easily folded by a user to form a three-dimensional geometric model. In this connection, it is an object to provide a product which may be readily folded by a user to form a geometric model having substantially the same characteristics of strength, durability and finish as prior models marketed in pre-formed condition.

Specifically, it is an object to provide a structure and method for forming three-dimensional geometric models, each of such models, when finally formed, having a plurality of flat sides and having a substantially continuous and smooth outer covering. Such covering not only extends over the flat sides of the model, but also over the edges thereof. In particular, it is an object of the invention to provide a geometric model, and its method of fabrication, in which the outer covering is in a state of tension especially along the edge of the model, to achieve the effect of a monocoque construction of high strength, rigidity and durability.

Other objects and advantages of the invention will appear from the specification and drawings, in which.

Figure 1:
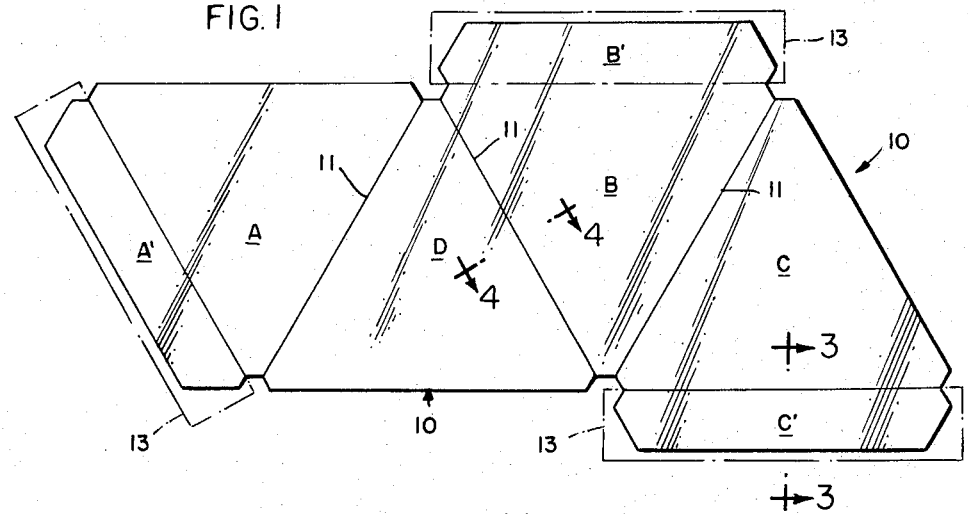
FIGURE 1 is a planned view of a blank or sheet embodying the present invention and adapted to be folded to form a three-dimensional model.
Figure 2:
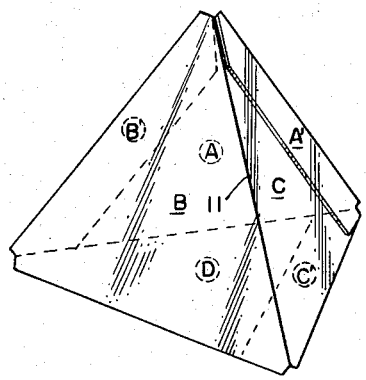
FIGURE 2 is a perspective view of a geometric model formed from such a blank.

The numeral 10 designates a generally flat die-cut sheet of construction material having a relatively rigid layer 14 and a stretchable, flexible layer 15, the two layers being secured together by any suitable means. For example, layers 14 and 15 may be laminated by heat sealing or by adhesively coating their opposing contacting surfaces. However, for the reasons brought out more fully hereinafter, it is particularly desirable to secure the layers together by means of a permanently tacky pressure-sensitive adhesive, suitable pressure sensitive adhesives, such as silicone resins in xylene, or rubber (ether natural or synthetic) adhesives, are well known and need not be described in detail herein.

Both of the layers are formed of plastic sheet materials and, preferably, of materials which are substantially transparent. Transparency is particularly advantageous because the angular relationships of the sides and edges of a completed geometric model may be more readily observed by a user, and is particularly desirable if a plurality of geometric models are to be assembled to represent molecular structures and arrangements.

It will be observed that the flat sheet 10 has the general configuration or outline of a geometric model in unfolded or lay-flat condition. In the illustration given, the sheet is shaped to be folded into a tetrahedron, but it is to be understood that the principles of the invention are applicable to the fabrication of a wide variety of other flat-sided solid geometric structures.

The inner layer 14 of the laminated plastic sheet should be formed of a relatively rigid or stiff plastic material. Polystyrene has been found effective, but other rigid plastic sheet materials may be used. In contrast, the outer layer 15 should be formed of a relatively stretchable and flexible plastic such as Mylar (modified polyester) or polyethylene. Other non-brittle plastic materials having similar properties of flexibility, stretchability, and toughness may be used.

Figure 3:
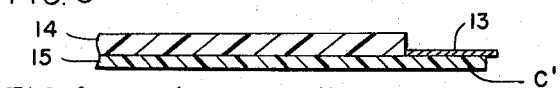
FIGURE 3 is an enlarged cross sectional view taken along the line 3—3 of FIGURE 1.
Figure 4:
FIGURE 4 is an enlarged sectional view taken along the line 4—4 of FIGURE 1.

Referring to FIGURES 1, 3, and 4, it will be observed that the upwardly facing inside surface of layer 14 is scored along lines 11 to define lines of structural weakness. Furthermore, the score lines, along with the peripheral limits of layer 14, define the side panels A, B, C, and D of the tetrahedron intended to be folded from the sheet. It will be observed that layer 15, which is substantially thinner than layer 14, projects beyond the periphery of layer 14 at several locations to provide tabs or flaps A′, B′, and C′. The upper or inner surfaces of the tabs are coated with a pressure-sensitive adhesive and the adhesive coating may be protected by removable cover strips 13. It is believed apparent that where a pressure-sensitive adhesive is used to secure the two layers of the sheet together, the same adhesive may be utilized for tabs A′–C′ and, in fact, the adhesive coating of the tabs may be an extension of the adhesive coating which secures the layers together.

Figure 5:
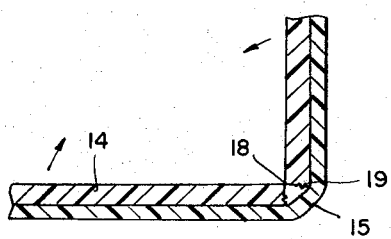
FIGURE 5 is an enlarged broken sectional view showing the structure of FIGURE 4 in folded condition.

FIGURE 1 illustrates the form in which an article embodying the present invention is intended to be marketed and acquired by a user. If the user then desires to form a solid geometric model from the sheet, he simply folds the interconnected panels A–C along the score lines extending therebetween to fracture the relatively thick inner layer 14 along the lines of structural weakness. It is essential during such a folding operation that the panels ultimately be folded in a direction away from the sheet's outer surface, that is, the surface defined by outer layer 15 (FIGURE 5). If desired, to insure a clean fracture of the relatively brittle plastic layer 14, the sheet may first be folded in a direction towards the outer surface, followed by the later folding of the sheet in the opposite or inward direction. During the final inward folding step, the fractured edges of inner layer 14 bear against each other, resulting in the application of a substantial tensioning force to outer layer 15 in the zone of the fracture lines. As shown most clearly in FIGURE 5, the inner corners or edges of the relatively thick inner layer 14 bear forcibly against each other, causing a separation of the outer corners or edges 19 of sheet 14 and a stretching of the unbroken plastic film or layer 15 over and about the line of fracture.

The blank or sheet 10 is simply folded until the free edges of panels A–C are in juxtaposition, protective strips 13 are then removed, and the adhesive-coated tabs or flaps A′, B′, and C′ are sealed to the outer surfaces of adjacent panels to secure the model in fully assembled condition.

It is to be noted that in the completed model, the unbroken outer sheet 15 provides a smooth integral covering which extends over not only the surfaces of panels A–D, but also over the edge portions of the model between those panels. Furthermore, it has been found that the tensioning of the outer plastic layer 15 along the edges of the geometric model contributes significantly in providing a finished model of suprisingly high structural rigidity and strength. Where a pressure-sensitive adhesive is used to secure the inner and outer layers together, the tensioning of the outer layer along the corners of the model tends to be transmitted to portions of the outer layer which overlie the inner layer to produce, in effect, a monocoque construction in which structural rigidity of the completed model is achieved to a considerable extent by the tensioned covering layer 15.

Since a user folds and assembles such models himself from flat blanks, he has ample opportunity to consider surface area relationships between plane and solid geometric representations and to examine the special relationships of angles and surfaces of solid geometric shapes. It is believed evident that the structure and method of the present invention are of considerable value in educating students who might otherwise encounter difficulty in grasping three-dimensional concepts.

While in the foregoing specification a detailed description of an embodiment of the invention has been set down for purposes of explanation, many variations in the details herein given may be made by those skilled in the art without departing from the spirit and scope of the invention.

I claim:

1. A blank for forming a geometric model, comprising a laminated sheet of plastic having the shape of a geometric solid in lay-flat condition, said sheet having a first layer of relatively rigid plastic and a second layer of relatively flexible and stretchable plastic secured to said first sheet, said first layer being scored along its exposed surface to define lines of structural weakness capable of fracturing when said sheet is folded into the shape of a geometric solid, and said second layer being capable of stretching over and about the fracture lines of said first layer to provide a smooth outer covering for said model when said sheet is folded.

2. The structure of claim 1 in which said sheet includes tab portions coated with a pressure-sensitive adhesive and securable to other portions of said sheet to maintain said model in folded condition.

3. The structure of claim 2 in which said tab portions comprise extensions of said second layer which project outwardly beyond the peripheral limits of said first layer.

4. The structure of claim 1 in which said first and second layers are formed of substantially transparent plastic material.

5. A blank for forming a geometric model, comprising a laminated sheet of plastic having the shape of a geometric solid in lay-flat condition, said sheet comprising a first layer of relatively thick plastic material and a second layer of relatively thin, flexible, and stretchable plastic material, said first layer being scored along its exposed surface to define fold lines for the folding of said sheet in a direction away from the outer surface of said second layer and into the shape of a geometric solid, said second layer being capable of stretching along said fold lines to provide a smooth outer covering for said model when said sheet is folded, and means provided by said sheet for securing said model in folded condition.

6. The structure of claim 5 in which said means comprises tab extensions of said second layer which project outwardly beyond the peripheral limits of said first layer, said tab extensions being coated with a pressure-sensitive adhesive and being securable to outer surface portions of said second layer for maintaining said model in folded and erected conditions.

7. The structure of claim 5 in which said first and second layers are formed of substantially transparent plastic material.

8. The structure of claim 5 in which the score lines of said first layer constitute lines of structural weakness for the fracture of said first layer along said lines when said sheet is folded.

9. The structure of claim 8 in which said first and second layers of said sheet are secured together by a pressure-sensitive adhesive.

10. In a method for constructing a geometric model from a sheet of laminated plastic, said sheet having a first layer of relatively rigid plastic with lines of weakness therealong and a second layer of relatively flexible and stretchable plastic secured to said first layer, and said sheet having the outline of a geometric solid in lay-flat condition and being adapted to be folded along said lines of weakness to form a three-dimensional geometric model, the step comprising folding said sheet along each of said lines of weakness to fracture said first layer therealong and simultaneously to tension and stretch the plastic of said second layer in the zones of said lines to provide a smooth unbroken outer covering along the edges of said model.

11. The method of claim 10 in which there is the further step of securing said sheet in folded condition.

References Cited
UNITED STATES PATENTS

| | | | |
|---|---|---|---|
| 2,798,596 | 7/1957 | Emmons | 229—22 |
| 2,935,238 | 5/1960 | Koehler | 229—22 |
| 3,022,251 | 5/1962 | Jarund | 229—22 |

EUGENE R. CAPOZIO, *Primary Examiner.*

W. GRIEB, *Examiner.*